(12) United States Patent
Fan et al.

(10) Patent No.: US 11,263,435 B2
(45) Date of Patent: Mar. 1, 2022

(54) METHOD FOR RECOGNIZING FACE FROM MONITORING VIDEO DATA

(71) Applicant: Guangxi University, Guangxi (CN)

(72) Inventors: Zuojun Fan, Guangxi (CN); Jian Gao, Guangxi (CN); Wenjun Jiang, Guangxi (CN); Guanglin Liang, Guangxi (CN)

(73) Assignee: Guangxi University, Nanning (CN)

( * ) Notice: Subject to any disclaimer, the term of this patent is extended or adjusted under 35 U.S.C. 154(b) by 0 days.

(21) Appl. No.: 16/941,581

(22) Filed: Jul. 29, 2020

(65) Prior Publication Data

US 2021/0034840 A1    Feb. 4, 2021

(30) Foreign Application Priority Data

Jul. 31, 2019  (CN) .......................... 201910701920.9

(51) Int. Cl.
*G06K 9/62* (2006.01)
*G06K 9/00* (2022.01)

(52) U.S. Cl.
CPC ..... *G06K 9/00268* (2013.01); *G06K 9/00255* (2013.01); *G06K 9/00288* (2013.01); *G06K 9/00744* (2013.01); *G06K 9/6215* (2013.01); *G06K 9/6223* (2013.01)

(58) Field of Classification Search
CPC .... G06K 9/00208–2009/00328; G06K 9/6215
See application file for complete search history.

(56) References Cited

U.S. PATENT DOCUMENTS

| 7,274,822 | B2 | 9/2007 | Zhang et al. | |
| 9,336,433 | B1* | 5/2016 | Ortiz | G06K 9/3233 |
| 10,755,082 | B2* | 8/2020 | Wang | G06K 9/6288 |

(Continued)

FOREIGN PATENT DOCUMENTS

| CN | 105279416 A | 1/2016 |
| CN | 106803054 A | 6/2017 |

(Continued)

OTHER PUBLICATIONS

Deng,Xing, "Research on 3D Face Recognition Under Expression Variations Based on Feature Extraction and Classification", Chinese Master's Dissertations Full-text Database, Information Technology Series, Jan. 15, 2019, pp. 138-164.

(Continued)

*Primary Examiner* — Brian Werner
(74) *Attorney, Agent, or Firm* — Yu Gang

(57) ABSTRACT

A method for recognizing a face from monitoring video data is disclosed. Two neural networks are used to compare and score high-dimensional face features of a face, and a K-neighbor algorithm and a screening mechanism with a Euclidean distance as a threshold are combined for face comparison recognition to obtain an accurate face recognition result. In addition, the present disclosure also performs further screening based on the time of video data and the frequency of face appearance, and finally obtains a recognition result, thereby obtaining a more accurate face recognition result. The present disclosure can perform relatively accurate face recognition on video data or picture data captured by a real-time or historical monitoring camera.

7 Claims, 5 Drawing Sheets

(56) References Cited

U.S. PATENT DOCUMENTS

| | | | | |
|---|---|---|---|---|
| 2005/0147292 A1* | 7/2005 | Huang | ............... | G06K 9/00228 |
| | | | | 382/159 |
| 2014/0375886 A1* | 12/2014 | Galleguillos | ...... | G06K 9/00295 |
| | | | | 348/571 |
| 2015/0317511 A1* | 11/2015 | Li | ..................... | G06K 9/00268 |
| | | | | 382/118 |
| 2019/0065897 A1 | 2/2019 | Li | | |
| 2020/0143148 A1* | 5/2020 | Sobh | ................. | G06K 9/00979 |

FOREIGN PATENT DOCUMENTS

| | | | |
|---|---|---|---|
| CN | 108597566 | A | 9/2018 |
| CN | 109344740 | A | 2/2019 |
| CN | 109389007 | A | 2/2019 |
| CN | 109583972 | A | 4/2019 |
| CN | 109948534 | A | 6/2019 |
| CN | 109977887 | A | 7/2019 |
| EP | 3113105 | A1 | 1/2017 |
| KR | 20030051554 | A | 6/2003 |

OTHER PUBLICATIONS

Sid-Ahemed Berrani et al. "On the Impact of Outliers on High-Dimensional Data Analysis Methods for Face Recognition", 2005 ACM, Dec. 31, 2005, pp. 1-7.

\* cited by examiner

METHOD FOR RECOGNIZING FACE FROM MONITORING VIDEO DATA

CROSS-REFERENCE TO RELATED APPLICATIONS

This application claims priority to Chinese Patent Application No. 201910701920.9, filed Jul. 31, 2019, entitled "Method for Recognizing Face from Monitoring Video Data". The above identified application is hereby incorporated herein by reference in its entirety.

TECHNICAL FIELD

The present disclosure relates to the technical field of computer vision, and more particularly, to a method for recognizing a face from monitoring video data.

BACKGROUND

With the popularization of big data, artificial intelligence-related technologies have shown rapid development, and gradually spread to people's daily lives. Computer vision in the four major fields of artificial intelligence has been recognized by people in recent years, a face recognition technology in computer vision has always been the focus of attention, and its accuracy has even exceeded the recognition accuracy of human eyes in some cases. Compared with other human biological characteristics, it has the advantages of non-contact, non-constraint, strong concealment, easy access, and more intuitive results, and can achieve recognition without interfering with a monitored person.

A computer vision face recognition technology has great development prospects in the security field. Used in real-time monitoring video data, it can complete functions such as blacklist alarm, whitelist protection tracking, blacklist and whitelist target locking and trajectory drawing. Used in historical monitoring data, it can quickly find out which camera and at which time point the target appears. A 7*24 (7 days*24 hours) working method of the computer vision face recognition technology greatly saves the human resource consumption of regional security monitoring work. The high concurrency function of the face recognition algorithm can also greatly reduce the time cost. Video data taken by multiple different devices can be viewed at the same time, and it also makes it necessary for humans to spend several hours of historical video data speeding up to tens of minutes or even minutes to complete the retrieval.

Although face recognition has many advantages, even exceeding the recognition accuracy of the human eye in certain situations, but due to a variety of placement methods of a monitoring camera that is an acquisition device of monitoring video data, variable camera distances, complicated shooting conditions, and a photographed person not looking directly at the device, the face angle, light, distance, expression, and ambiguity in the video data are complex and variable. These circumstances make the face recognition more difficult, resulting in misjudgment and missed judgment of a program algorithm.

SUMMARY

The present disclosure is directed to the problem that the existing face recognition method is prone to misjudgment and missed judgment in monitoring video data, and provides a method for recognizing a face from monitoring video data to cope with bad conditions of face recognition in monitoring video data and to improve the accuracy of face recognition in monitoring video data.

To solve the above problems, the present disclosure is achieved by the following technical solutions.

A method for recognizing a face from monitoring video data includes the following steps.

In step 1, a self-made face photo set is collected in a monitoring area, a public face data set is obtained, the self-made face photo set and the public face data set are pre-processed, and a face detection algorithm and a feature extractor are used to extract high-dimensional features of a face from a pre-processed face data set, which are saved as a training set of a model.

In step 2, face-containing video data is collected using a monitoring camera device in the monitoring area, face pictures in a video are extracted using an existing face detection algorithm, pictures in which a face is completely hard to be seen are filtered out through simple manual screening, and tags of the face pictures are manually marked and saved as a verification set of the model finally.

In step 3, two different face comparison models, namely a first face comparison model and a second face comparison model, are selected.

In step 4, the two face comparison models in step 3 are trained using the training set in step 1 respectively, the two face comparison models in step 3 are verified using the verification set in step 2, and then the obtained two face comparison models are saved.

In step 5, K standard face photos of each trusted identity are collected, high-dimensional features of a standard face are extracted from each standard face photo using a feature extractor, a face matrix is formed by the standard face photos, the high-dimensional features of the standard faces and corresponding identity tags and saved, and thus a face standard database is established.

In step 6, video data is collected in real time using the monitoring camera device in the monitoring area, each frame of a picture is acquired in a video stream frame by frame, and high-dimensional features of all faces to be recognized in each frame of the picture are extracted using the face detection algorithm and the feature extractor.

In step 7, the following operations are executed respectively on the high-dimensional features of each face to be recognized obtained in step 6.

In step 7.1, the high-dimensional features of a face to be recognized and the face matrix obtained in step 5 are input jointly into the two face comparison models saved in step 4. Each face comparison model outputs a matched score value between the high-dimensional features of the face to be recognized and the high-dimensional features of each standard face of the face standard database.

In step 7.2, weighted fusion is performed on the matched score value of the first face comparison model obtained in step 7.1 and the matched score value of the second face comparison model to obtain a comprehensive matched score value between the high-dimensional features of the face to be recognized and the high-dimensional features of each standard face of the face standard database.

In step 7.3, the identity tags corresponding to the high-dimensional features of the L standard faces with high comprehensive matched score values are selected as preliminary recognition identity tags for model recognition.

In step 7.4, the high-dimensional features of a face to be recognized and the face matrix obtained in step 5 are input jointly into the K-neighbor algorithm. In the K-neighbor algorithm, a Euclidean distance E1 between the high-dimensional features of the face to be recognized and the high-dimensional features of each standard face of the face standard database is first calculated, the identity tags corresponding to the high-dimensional features of K standard faces with a small Euclidean distance E1 are then selected, if K−1 identity tags among the K identity tags are the same, the K-neighbor algorithm outputs the same identity tag as the preliminary recognition identity tag for algorithm recognition, and a Euclidean distance average value E of the K−1 identity tags is calculated, otherwise, the K-neighbor algorithm outputs no solution.

In step 7.5, when the preliminary recognition identity tag for algorithm recognition obtained in step 7.4 exists in the preliminary recognition identity tag for model recognition obtained in step 7.3, the Euclidean distance average value corresponding to the preliminary recognition identity tag for algorithm recognition is compared with a set similarity threshold:

When the Euclidean distance average value is greater than the set similarity threshold, the preliminary recognition identity tag for algorithm recognition is used as a recognition result of the high-dimensional features of the face to be recognized, and one record is formed by the high-dimensional features of the face to be recognized, the comprehensive matched score value, the Euclidean distance average value and the identity tag, and put into a recognizable set.

Otherwise, there is no solution for the high-dimensional features of the face to be recognized, and one record is formed by the high-dimensional features of the face to be recognized, and put into an unrecognized set.

K and L are set positive integers more than 1.

Two different face comparison models established in step 3 are as follows.

A calculation process of the first face comparison model is as follows: first calculating a product, sum, absolute difference and square of the difference between the high-dimensional features of the faces of two people and splicing into matrix data, then performing an activation function which is a convolution calculation and batch normalization of a modified linear unit, then performing an activation function which is a convolution calculation and batch normalization calculation of a linear regression, and finally outputting a score value by a fully connected layer in which an activation function is an S-type function.

A calculation process of the second face comparison model is as follows: first calculating a product, sum, absolute difference and square of the difference between the high-dimensional features of the faces of two people and splicing into matrix data, then performing an activation function which is a convolution calculation and batch normalization of a modified linear unit, then performing squeeze and excitation module calculation of an attention mechanism, then performing an activation function which is a convolution calculation and batch normalization calculation of a linear regression, and finally outputting a score value by a fully connected layer in which an activation function is an S-type function.

In the above solution, a value of K is 4, and a value of L is 3.

As an improvement, the face recognition analysis method used in monitoring video data further includes the following steps.

In step 8, all the records of the previous m seconds are taken out at an interval of 1 s, from the recognizable set obtained in step 7, classification is performed according to the identity tags, and the high-dimensional features of the face to be recognized with the highest comprehensive matched score value of each identity tag are saved as a preliminary screening result of each second.

In step 9, a Euclidean distance between two of the high-dimensional features of the face to be recognized in the preliminary screening result of the each second obtained in step 8 is calculated respectively.

If the Euclidean distance E2 is less than or equal to the set similarity threshold, it indicates that the high-dimensional features of two faces to be recognized are the same person, and retaining only the identity tags with relatively high comprehensive matched score values as valid recognition results of the high-dimensional features of the face to be recognized of the each second.

If the Euclidean distance E2 is greater than the set similarity threshold, it indicated that the high-dimensional features of two faces to be recognized are different people, retaining the two identity tags at the same time as valid recognition results of the high-dimensional features of the face to be recognized of the each second.

In step 10, when trying to output the valid recognition results of the high-dimensional features of each face to be recognized, all the valid recognition results of the previous n seconds are traversed first, and a Euclidean distance between the high-dimensional features of the face to be recognized which try to be output currently and the high-dimensional features of the face to be recognized corresponding to all the valid recognition results is calculated:

If any Euclidean distance is less than or equal to the set similarity threshold, it indicates that the valid recognition result of the high-dimensional features of the face to be recognized which try to be output currently has been output before, without needing to be output again.

Otherwise, it indicates that the valid recognition results of the high-dimensional features of the face to be recognized which try to be output currently are not, output, and outputting the current result.

m and n are set positive integers more than 1.

In the above solution, a value of m is 3, and a value of n is 5.

As an improvement, the face recognition analysis method used in monitoring video data further includes a step of judging whether a recognition result in the unrecognized set is output:

In step 11, all the high-dimensional features of the face to be recognized which try to be output within I seconds are traversed, and a Euclidean distance E4 between the high-dimensional features of the face to be recognized in the unrecognized set and the high-dimensional features of the face to be recognized which try to be output is calculated:

when there are the high-dimensional features of the face to be recognized in which the Euclidean distance E4 is less than or equal to the similarity threshold in the unrecognized set, it indicates that the recognition result of the high-dimensional features of the face to be recognized has been output, and the high-dimensional features of the face to be recognized are deleted from the unrecognized set.

Otherwise, the high-dimensional features of the face to be recognized are retained in the unrecognized set.

I is a set positive integer more than 1.

In the above solution, a value of I is 5.

Compared with the conventional art, in the present disclosure, two neural networks are used to compare and score high-dimensional face features of a face, and a K-neighbor algorithm and a screening mechanism with a Euclidean distance as a threshold are combined for face comparison recognition to obtain an accurate face recognition result. In addition, the present disclosure also performs further screening based on the time of video data and the frequency of face appearance, and finally obtains a recognition result, thereby obtaining a more accurate face recognition result. The present disclosure can perform relatively accurate face recognition on video data or picture data captured by a real-time or historical monitoring camera.

DETAILED DESCRIPTION OF THE EMBODIMENTS

In order to make the purposes, technical solutions and advantages of the present disclosure clearer, the present disclosure will be further described in detail below with reference to specific embodiments.

Figure 1:
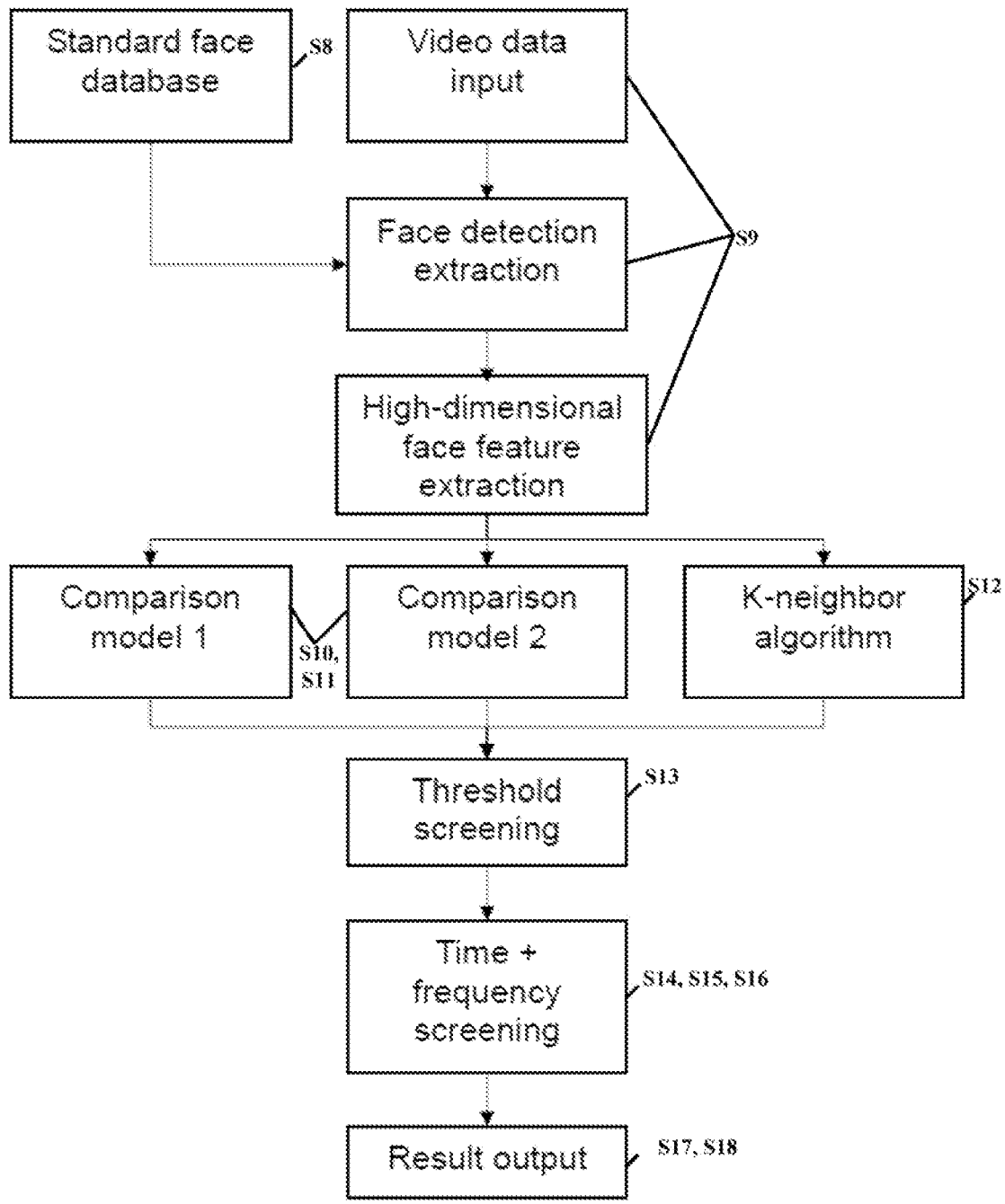
FIG. 1 is a flowchart of a method for recognizing a face from monitoring video data.

A method for recognizing a face from monitoring video data, as shown in FIG. 1, includes the following steps:

(1) Preparation:

Step S1: Data Set Preparation:

A public CASIA-Webface face data set, an MS-Celeb-1M face data set, a VGGFace2 face data set, and a face photo set of students and teachers collected in Guangxi University are obtained. A CASIA-Webface face database includes 494,414 face pictures of 10,575 people, each with an average of 46.8 training data. An MS-Celeb-1M face database includes approximately 100,000,000 different face pictures of 100,000 celebrities, each with an average of 100 training data. A VGGFace2 face data set includes 3,310,000 pictures of 9131 people, each with an average of 362.6 training data. The face photo set internally collected by the Guangxi University includes 150,000 pictures of 15,000 people, each with an average of 10 training data.

Step. S2: Verification Set Manufacturing:

Face-containing video data is collected by a monitoring camera in the Guangxi University, face pictures in the Face-containing video data are extracted using a Dual Shot Face Detector (DSFD) algorithm, pictures in which a face is completely hard to be seen are filtered out through simple manual screening, and tags of the face pictures after the filtration are manually marked and made into a verification data set. A test data set includes 3592 face pictures of 100 people, each with an average of 35.92 face pictures.

Step S3: Feature Extractor Preparation:

The DSFD face detection algorithm is used first to extract a face picture in an image. Then, based on a loss function (logical normalization index cross entropy+center loss), a deep convolutional neural network InceptionResnetV1 (a network structure) in FaceNet (embedding method commonly used for face recognition and clustering) is trained, and the trained deep convolutional neural network is used to form a feature extractor. Finally, the feature extractor is used to further extract 512-dimensional face high-dimensional face features from the extracted face picture.

Step S4: Training Set Preparation:

The data set prepared in step S1 is subjected to preprocessing operations such as merging, filtering, flipping, deforming, denoising, and normalization. The feature extractor in S3 is used to extract the preprocessed data set into 512-dimensional face features and save as a training set.

Step S5: K-Neighbor Algorithm Writing:

A K-neighbor algorithm refers to that most of the K nearest neighbor samples of a sample in a feature space belong to a category, and then the sample also belongs to this category, and has the characteristics of the this category of sample. A Euclidean distance is used here to calculate whether the feature spaces are adjacent. The Euclidean distance formula is:

$$d=\sqrt{(x_1-x_2)^2+(y_1-y_2)^2+\ldots+(y_{n_1}-y_{n_2})^2}$$

According to the verification of the verification set in step S2, thresholds of K and d are obtained as follows: K=n=4, when d>0.895, the effect is the best, and n is the number of standard photos of the face.

Figure 2:
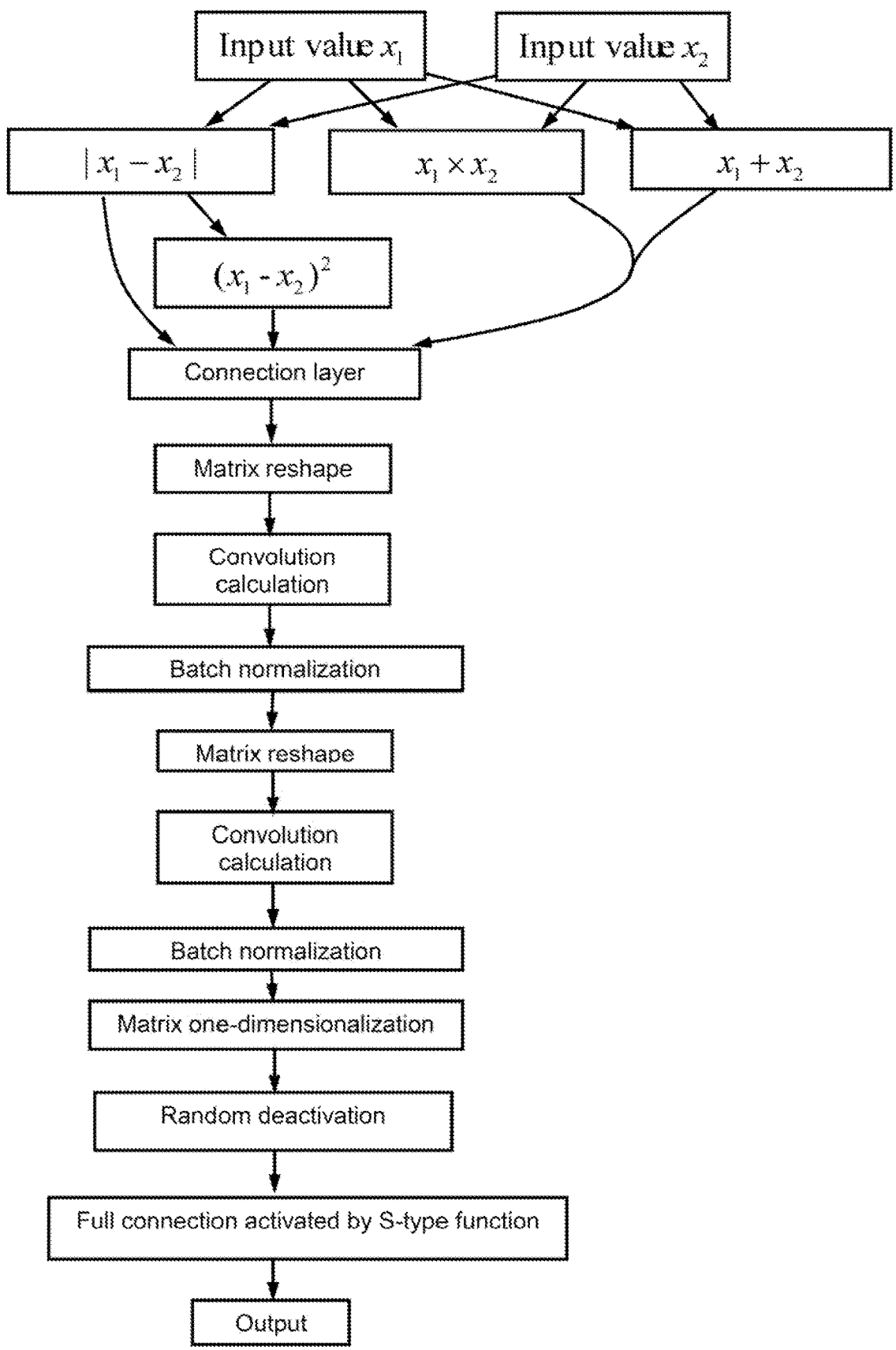
FIG. 2 is a first face comparison model.
Figure 3:
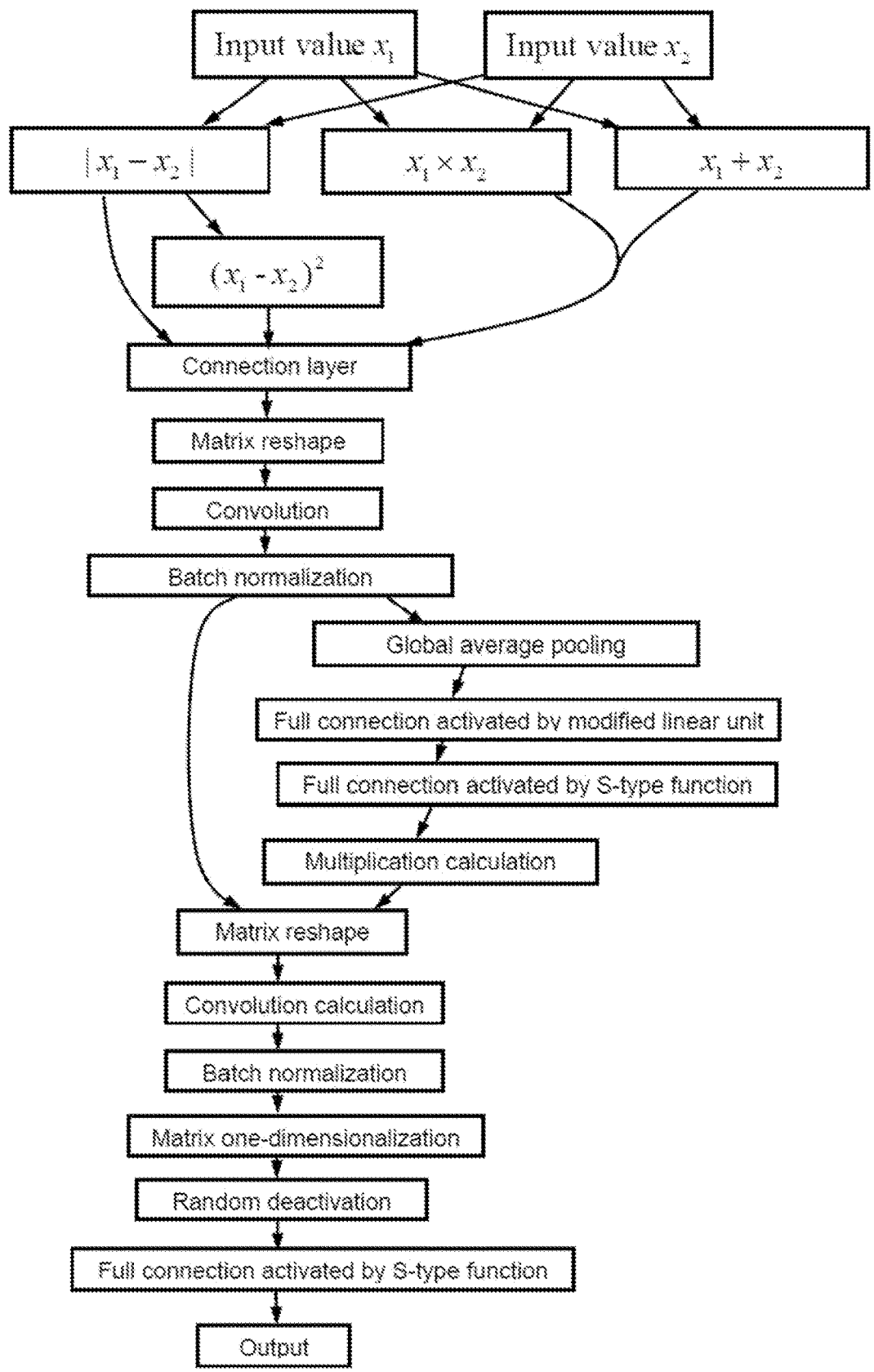
FIG. 3 is a second face comparison model.

Step S6: Face Comparison Model Establishment:

In the present disclosure, two metric learning algorithm models based on convolutional neural networks are used to compare high-dimensional face features, and then the K-neighbor algorithm in step S5 is fused to achieve the purpose of face recognition. The metric learning algorithm models based on convolutional neural networks are shown in FIG. 2 and FIG. 3.

Detailed Model:

A face comparison model, shown in FIG. 2 has 838 parameter values, and the calculation process is as follows. First, the product, sum, absolute difference, and square of the difference between high-dimensional features of the faces of two people are calculated and spliced into matrix data with a shape of 4×512×1. Then, a convolution calculation with a convolution kernel of 4×1 is performed to obtain matrix data with a shape of 1×512×32, and a batch normalization calculation is performed. Thereafter, the matrix data is transformed into 512×32×1 and a convolution calculation with a convolution kernel of 1×32 is performed to obtain matrix data with a shape of 512×1×1. After the batch normalization calculation, the matrix is one-dimensionalized and then 50% of hidden neurons are deactivated. Finally, a fully connected calculation with an activation function of "S-type function" results in a score value used to judge the matching degree of the faces of two people.

A face comparison model shown in FIG. 3 has 1390 parameter values, and the calculation process is as follows. First, the product, sum, absolute difference, and square of the difference between high-dimensional features of the faces of two people are calculated and spliced into matrix data with a shape of 4×512×1. Then, a convolution calculation with a convolution kernel of 4×1 is performed to obtain matrix data with a shape of 1×512×32, and a batch normalization calculation is performed to obtain a matrix r1. Next, the "squeeze and excition" module of the "attention" mechanism is calculated. The specific calculation process of the module is to perform the global average pooling calculation of the matrix r1, then perform a fully connected calculation using one modified linear unit, then perform a fully connected calculation using an S-type function, convert the calculation result into a matrix r2 with a shape of 1×1×32, and then multiply r1 by r2 to obtain matrix data with a shape of 1×512×32. Here, the calculation of the "squeeze and excition" module ends. Thereafter, the matrix data calculated by the "squeeze and excitation" module is transformed into 512×32×1 and a convolution calculation with a convolution kernel of 1×32 is performed to obtain matrix data with a shape of 512×1×1, and the matrix is one-dimensionalized and then 50% of hidden neurons are deactivated. Finally, a fully connected calculation with an activation function of "S-type function" results in a score value used to judge the matching degree of the faces of two people.

The structures of the models in FIG. 2 and FIG. 3 are similar. With one difference. the algorithm model in FIG. 3 adds a "squeeze and excition" module of an "attention" mechanism after the first convolution calculation compared with the algorithm model in FIG. 2.

Step S7: Model Training:

The training set made in step S4 and the loss function "binary cross entropy" are used to train the two algorithm models established in step S6, the verification set made in step S2 is used for rational verification of the algorithm, and the final model is saved.

Step S8: Face Matrix Establishment:

A face standard database is a basic database of a face recognition process, which stores the standard, high-definition, multi-angle face photos of a person to be recognized and their corresponding tags. A face database requires that there is at least one face photo/person, the best effect is 4 photos/person (K=4), the feature extractor in step S3 is used to extract pictures in the face standard database into high-dimensional face features, and a facial matrix is formed by the tags corresponding to the high-dimensional face features and saved.

(2) Face Recognition Process:

Step S9: Video data collected by a monitoring device is input, each frame of the picture is acquired in a video stream frame by frame, and high-dimensional features of faces in each frame of the picture are extracted using the feature extractor in step S3.

Step S10: The high-dimensional face features acquired in step S9 and the face matrix obtained in step S8 are input into the trained two face comparison models obtained in step S7, and a matched score value between the high-dimensional features of each face to be recognized of the current frame and the high-dimensional features of a standard face is calculated (the matched score value is a 32-bit floating point decimal between 0.0 and 1.0 obtained by the model based on a deep learning algorithm, and a larger value indicates a higher matching degree).

Step S11: The results in step S10 are assigned with weights of 0.6 and 0.4 respectively according to the accuracy of the two face comparison models in the verification set when training in step 7, and added to obtain a comprehensive result. The top three recognition target tags with the highest comprehensive result scores are selected, and the results are saved.

Step S12: The high-dimensional face features acquired in step S9 and the face matrix obtained in step S8 are input into the K-neighbor algorithm in step S5. In the K-neighbor algorithm, a Euclidean distance E1 between the high-dimensional features of the face to be recognized and the high-dimensional features of each standard face of the face standard database is first calculated, the identity tags corresponding to the high-dimensional features of K standard faces with a small Euclidean distance E1 are then selected, if K−1 identity tags among the K identity tags are the same, the K-neighbor algorithm outputs this identity tag as a preliminary target tag for algorithm recognition, and a Euclidean distance average value E of the K−1 identity tags is calculated, otherwise, the K-neighbor algorithm outputs no solution.

Step S13: When the result of step S12 and the result of S11 have a coexisting tag result, the Euclidean distance average value of the high-dimensional face features of the tag result in step S12 is used to be compared with a threshold d in step S5, and the recognition result is divided into Known and Unknown (when the Euclidean distance average value is greater than the threshold d, the recognition result is determined as Known, and when the Euclidean distance average value is less than the threshold d, the recognition result is determined as Unknown).

(3) Face Verification:

Step S14: Recognition Result Receiving:

The recognition results in step S13 are recorded in chronological order. The recognition results are divided into two categories, Known and Unknown, which are stored separately. The Known contains the name, face and matching degree of a recognized person. The Unknown contains a face, but the face does not match any person in a face database. All data 5 s before the current time is retained for mutual comparison, and invalid results are screened out.

Figure 4:
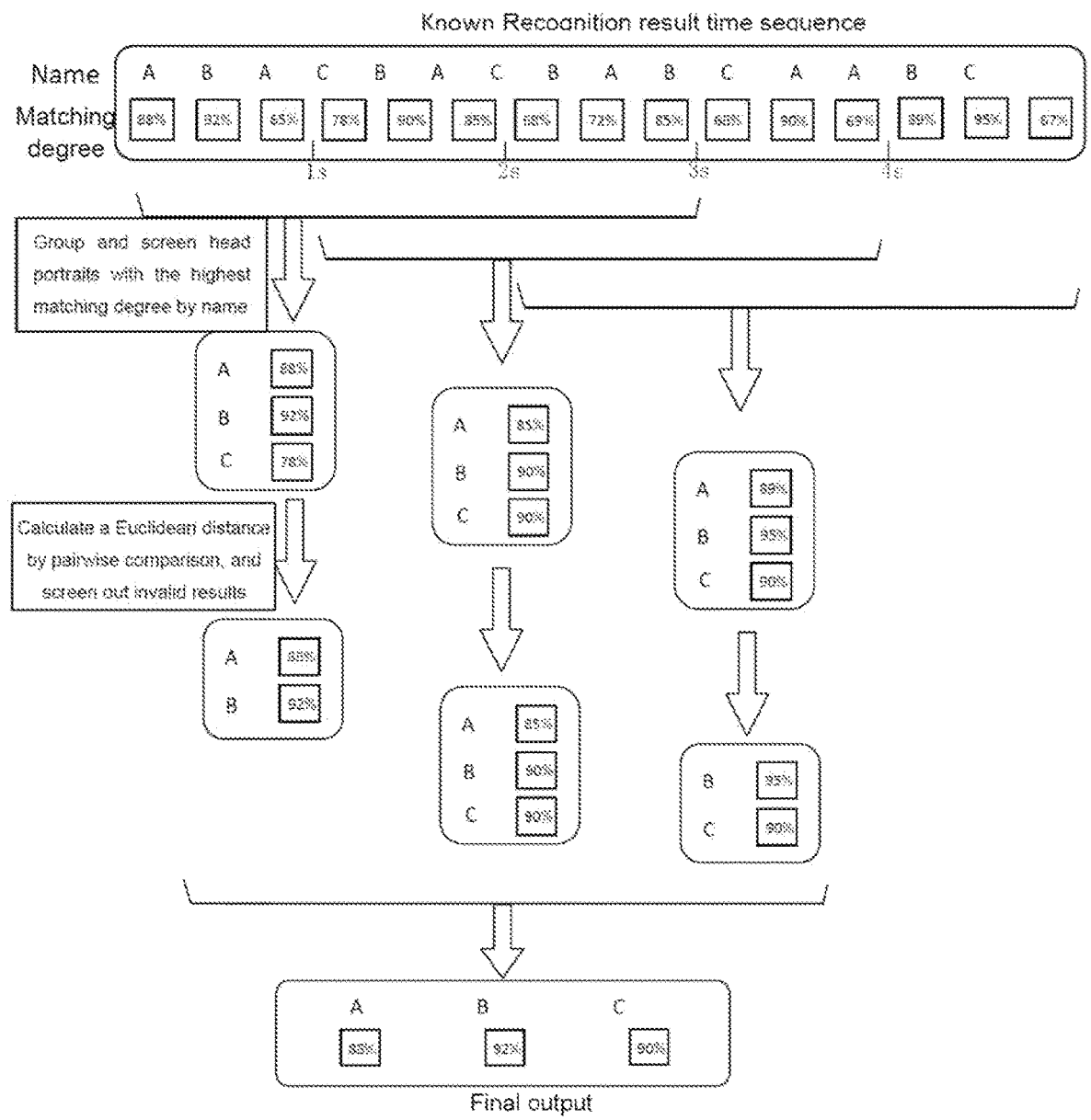
FIG. 4 is a screening flowchart of a Known result based on a Euclidean distance.

The Results in Known are Processed (Referring to FIG. 4):

Step S15: The Known results are grouped and screened: data within 3 seconds of the Known recognition result in step S14 is taken out at an interval of 1 s and classified by name, and a face with the highest matching degree is selected. By moving backwards in sequence, a set of results with the highest matching degree of one-to-one correspondence with the name may be obtained every second.

Step S16: Invalid results are filtered out: each of the recognition results is taken from a set of data obtained in step S15 and compared with each other in pairs, a Euclidean distance E of a high-dimensional face feature vector is calculated, and a face similarity threshold d in step S5 is taken. If E≤d, the two result images are considered to be the same person, but the data obtained in step S15 is a name corresponding to a face. At this time, the faces corresponding to the results of two different names are determined as the same person, which means that the recognition result of one of the people is invalid. At this time, the higher matching degree is taken as a valid result, and the lower matching degree is selected. If there is no E≤d between every two recognition results after comparison, it is considered that each recognition result in this set of data is valid.

Step S17: It is judged whether the screening result of step S16 is output: after the screening of steps S15-S16, each set of data obtained is valid recognition data, but because the value method is to take the recognition result of 3 s every 1 s, repeated values may be caused. At this time, it is necessary to judge which data in this group of results has been output, thereby avoiding the situation of repeated output.

The specific implementation mode is to traverse a Known output record within 5 s when trying to output a certain result of this group, and calculate the Euclidean distance E of between a feature vector of each face in the Known output record and the feature vector of the face trying to be output currently in sequence. If there is a face with E≤d in the Known output record, it means that the current result has been output and there is no need to output it again. If there is no E≤d in the Known output record, the current result should be output and the result is stored in the Known output record.

Figure 5:
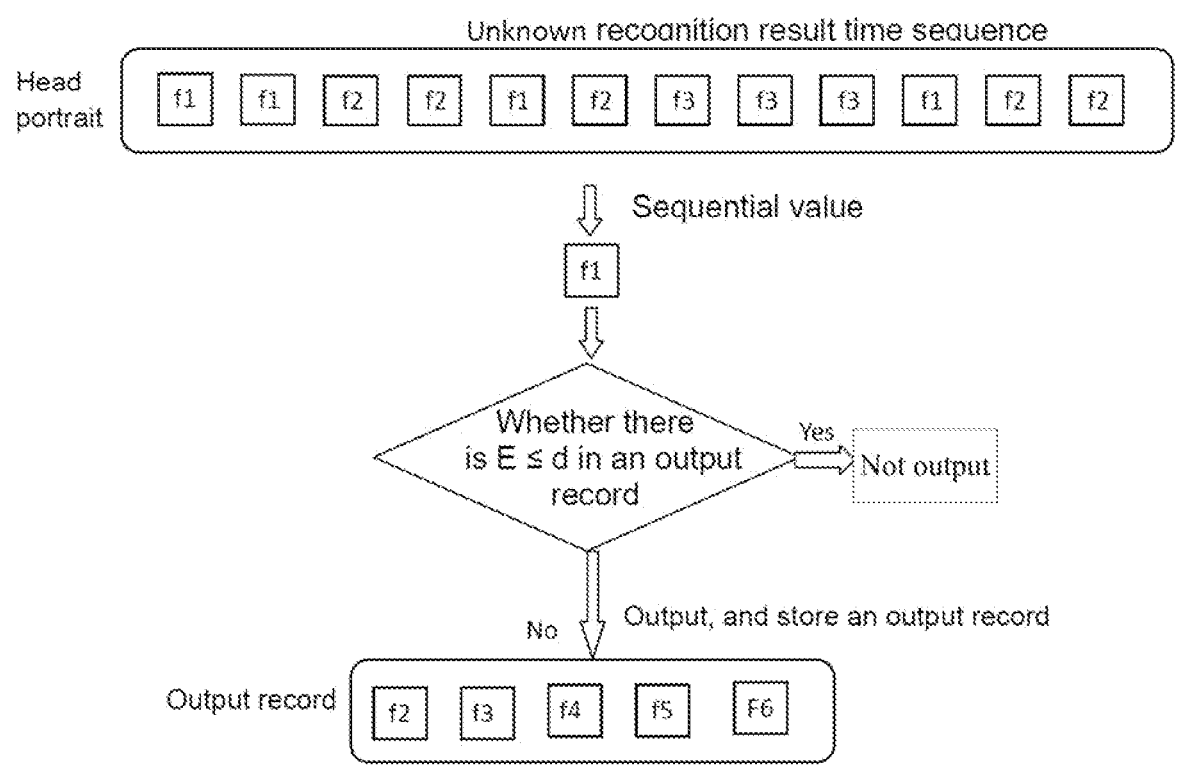
FIG. 5 is a screening flowchart of an Unknown result based on a Euclidean distance.

The Results in Unknown are Processed (Referring to FIG. 5):

Step S18: It is judged whether an Unknown result is output: recognition results in Unknown are taken in sequence, an Unknown output record within 5 s is traversed, and the Euclidean distance E between a feature vector of each face in the Unknown output record and the feature vector of the face trying to be output currently is calculated in sequence. If there is a face with E≤d in the Unknown output record, it means that the current result has been output, there is no need to output it again and the result is deleted from Unknown. If there is no E≤d in the Unknown output record, this result should be output and the result is continuously stored in Unknown.

It should be noted that, although the embodiments of the present disclosure described above are illustrative, this is not a limitation of the present disclosure, so the present disclosure is not limited to the above specific implementation manners. Without departing from the principles of the present disclosure, all other implementation manners obtained by those skilled in the art under the inspiration of the present disclosure are deemed to be within the protection of the present disclosure.

What is claimed is:

1. A method for recognizing a face from monitoring video data, comprising:
   step 1, collecting in a monitoring area, a self-made face photo set, obtaining a public face data set, pre-processing the self-made face photo set and the public face data set, using a face detection algorithm and a feature extractor to extract high-dimensional features of a face from a pre-processed face data set, and saving as a training set of a model, wherein the high-dimensional features are 512 dimensions features;
   step 2, collecting face-containing video data using a monitoring camera device in the monitoring area, extracting face pictures in a video using an existing face detection algorithm, filtering out through simple manual screening, pictures in which a face is hard to be seen, manually marking tags of the face pictures, and saving as a verification set of the model finally;
   step 3, selecting two different face comparison models, namely a first face comparison model and a second face comparison model;
   step 4, training the two face comparison models in step 3 using the training set in step 1 respectively, verifying the two face comparison models in step 3 using the verification set in step 2, and then saving the obtained two face comparison models;
   step 5, collecting K standard face photos of each trusted identity, extracting high-dimensional features of a standard face from each standard face photo using a feature extractor, forming a face matrix by standard face photos, the high-dimensional features of the standard faces and corresponding identity tags, saving the face matrix, and thus establishing a face standard database;
   step 6, collecting video data in real time using the monitoring camera device in the monitoring area, acquiring each frame of a picture in a video stream frame by frame, and extracting high-dimensional features of all faces to be recognized in each frame of the picture using the face detection algorithm and the feature extractor;
   step 7, executing following operations respectively on the high-dimensional features of each face to be recognized obtained in step 6;
   step 7.1, jointly inputting the high-dimensional features of a face to be recognized and the face matrix obtained in step 5 into the two face comparison models saved in step 4, outputting by each face comparison model, a matched score value between the high-dimensional features of the face to be recognized and the high-dimensional features of each standard face of the face standard database;
   step 7.2, performing weighted fusion of the matched score value of the first face comparison model obtained in step 7.1 and the matched score value of the second face comparison model to obtain a comprehensive matched score value between the high-dimensional features of the face to be recognized and the high-dimensional features of each standard face of the face standard set;
   step 7.3, selecting the identity tags corresponding to the high-dimensional features of the L standard faces with high comprehensive matched score values as preliminary recognition identity tags for model recognition;
   step 7.4, jointly inputting the high-dimensional features of a face to be recognized and the face matrix obtained in step 5 into the K-neighbor algorithm, wherein in the K-neighbor algorithm, a Euclidean distance E1 between the high-dimensional features of the face to be recognized and the high-dimensional features of each standard face of the face standard database is first calculated, the identity tags corresponding to the high-dimensional features of K standard faces with a small Euclidean distance E1 are then selected, if K−1 identity tags among the K identity tags are the same, the K-neighbor algorithm outputs the same identity tag as the preliminary recognition identity tag for algorithm recognition, and a Euclidean distance average value E of the K−1 identity tags is calculated, otherwise, the K-neighbor algorithm outputs no solution;
   step 7.5, when the preliminary recognition identity tag for algorithm recognition obtained in step 7.4 exists in the preliminary recognition identity tag for model recognition obtained in step 7.3, comparing the Euclidean distance average value E corresponding to the preliminary recognition identity tag for algorithm recognition with a set similarity threshold:
   when the Euclidean distance average value E is greater than the set similarity threshold, using the preliminary recognition identity tag for algorithm recognition as a recognition result of the high-dimensional features of the face to be recognized, forming one record by the high-dimensional features of the face to be recognized, the comprehensive matched score value, the Euclidean distance average value and the identity tag, and putting the record into a recognizable set;
   otherwise, providing no solution for the high-dimensional features of the face to be recognized, forming one record by the high-dimensional features of the face to be recognized, and putting the record into an unrecognized set,
   K and L being set positive integers more than 1.

2. The method as claimed in claim 1, wherein two different face comparison models established in step 3 are as follows:
   a calculation process of the first face comparison model is as follows: first calculating a product, sum, absolute difference and square of the difference between the high-dimensional features of the faces of two people and splicing into matrix data, then performing an activation function which is a convolution calculation and batch normalization of a modified linear unit, then performing an activation function which is a convolution calculation and batch normalization calculation of a linear regression, and finally outputting a score value by a fully connected layer in which an activation function is an S-type function; and
   a calculation process of the second face comparison model is as follows: first calculating a product, sum, absolute difference and square of the difference between the high-dimensional features of the faces of two people and splicing into matrix data, then performing an activation function which is a convolution calculation and batch normalization of a modified linear unit, then performing squeeze and excitation module calculation of an attention mechanism, then performing an activation function which is a convolution calculation and batch normalization calculation of a linear regression, and finally outputting a score value by a fully connected layer in which an activation function is an S-type function.

3. The method as claimed in claim 1, wherein a value of K is 4, and a value of L is 3.

4. The method as claimed in claim 1, further comprising a step of judging whether a recognition result in the recognizable set is output:

step 8, taking out at an interval of 1 s, all the records of previous m seconds from the recognizable set obtained in step 7, performing classification according to the identity tags, and saving high-dimensional features of a face to be recognized with a highest comprehensive matched score value of each identity tag as a preliminary screening result of each second;

step 9, respectively calculating a Euclidean distance E2 between two of the high-dimensional features of the face to be recognized in the preliminary screening result of the each second obtained in step 8:

if the Euclidean distance E2 is less than or equal to the set similarity threshold, indicating that the high-dimensional features of two faces to be recognized are the same person, and retaining the identity tags with relatively high comprehensive matched score values as valid recognition results of the high-dimensional features of the face to be recognized of the each second;

if the Euclidean distance E2 is greater than the set similarity threshold, indicating that the high-dimensional features of two faces to be recognized are different people, retaining the two identity tags at the same time as valid recognition results of the high-dimensional features of the face to be recognized of the each second;

step 10, when trying to output the valid recognition results of the high-dimensional features of each face to be recognized, first traversing all the valid recognition results of previous n seconds, and calculating a Euclidean distance E3 between the high-dimensional features of the face to be recognized which try to be output currently and the high-dimensional features of the face to be recognized corresponding to all the valid recognition results:

if any Euclidean distances E3 is less than or equal to the set similarity threshold, indicating that the valid recognition result of the high-dimensional features of the face to be recognized which try to be output currently has been output before, without needing to be output again;

otherwise, indicating that the valid recognition results of the high-dimensional features of the face to be recognized which try to be output currently are not output, and outputting the current result, m and n being set positive integers more than 1.

5. The method as claimed in claim 4, wherein a value of m is 3, and a value of n is 5.

6. The method as claimed in claim 4, further comprising a step of judging whether a recognition result in the unrecognized set is output:

step 11, traversing all the high-dimensional features of the face to be recognized which try to be output within 1 seconds, and calculating a Euclidean distance E4 between the high-dimensional features of the face to be recognized in the unrecognized set and the high-dimensional features of the face to be recognized which try to be output:

when there are the high-dimensional features of the face to be recognized in which the Euclidean distance E4 is less than or equal to the similarity threshold in the unrecognized set, indicating that the recognition result of the high-dimensional features of the face to be recognized has been output, and deleting the high-dimensional features of the face to be recognized from the unrecognized set;

otherwise, retaining the high-dimensional features of the face to be recognized in the unrecognized set, l being a set positive integer more than 1.

7. The method as claimed in claim 6, wherein a value of l is 5.

* * * * *